United States Patent [19]

Chang

[11] Patent Number: 5,429,039
[45] Date of Patent: Jul. 4, 1995

[54] MULTIPURPOSE COOKER

[76] Inventor: Kwei T. Chang, No. 14, Lane 54, Luong Chuan St., Panchia City, Taipei Hsien, Taiwan

[21] Appl. No.: 297,782

[22] Filed: Aug. 30, 1994

[51] Int. Cl.⁶ ............................................. A47J 27/00
[52] U.S. Cl. ..................................... 99/331; 99/337; 99/403; 219/435; 219/441; 219/442
[58] Field of Search ............................ 99/330–332, 99/337, 338, 403, 410; 219/441, 442, 429–438, 415, 424, 425; 426/508, 523

[56] References Cited

U.S. PATENT DOCUMENTS

| | | | |
|---|---|---|---|
| 2,431,582 | 11/1947 | Page | 219/442 |
| 2,785,277 | 3/1957 | Jepson | 219/442 |
| 2,931,884 | 4/1960 | Jepson et al. | 219/442 |
| 3,508,485 | 4/1970 | Munsey | 99/331 |
| 3,908,111 | 9/1975 | DuBois et al. | 219/432 |
| 4,234,783 | 11/1980 | Aoshima | 219/441 |
| 4,241,288 | 12/1980 | Aoshima et al. | 219/441 |
| 4,307,287 | 12/1981 | Weiss | 219/442 |
| 4,670,282 | 6/1987 | Onishi et al. | 426/523 |
| 4,672,179 | 6/1987 | Onishi et al. | 99/403 |
| 5,048,400 | 9/1991 | Ueda et al. | 99/331 |
| 5,092,229 | 3/1992 | Chen | 99/337 |

Primary Examiner—Timothy F. Simone
Attorney, Agent, or Firm—Browdy and Neimark

[57] ABSTRACT

A multipurpose cooker, which includes a cooker body a cover hinged to the cooker body, an inner casing fixedly mounted within the cooker body, an electric heater supported on springs inside the inner casing, a heating control circuit, an inductor disposed inside the inner casing, an inner pan received within the inner casing and supported on the electric heater, wherein the inner pan is forced by the cover to contact the inductor when the cover is closed, causing the heating control circuit to turn on the electric heater; the electric heater is lifted by the springs to move the inner pan away from the inductor when the cover is opened, causing the heating control circuit to turn off the electric heater.

6 Claims, 10 Drawing Sheets

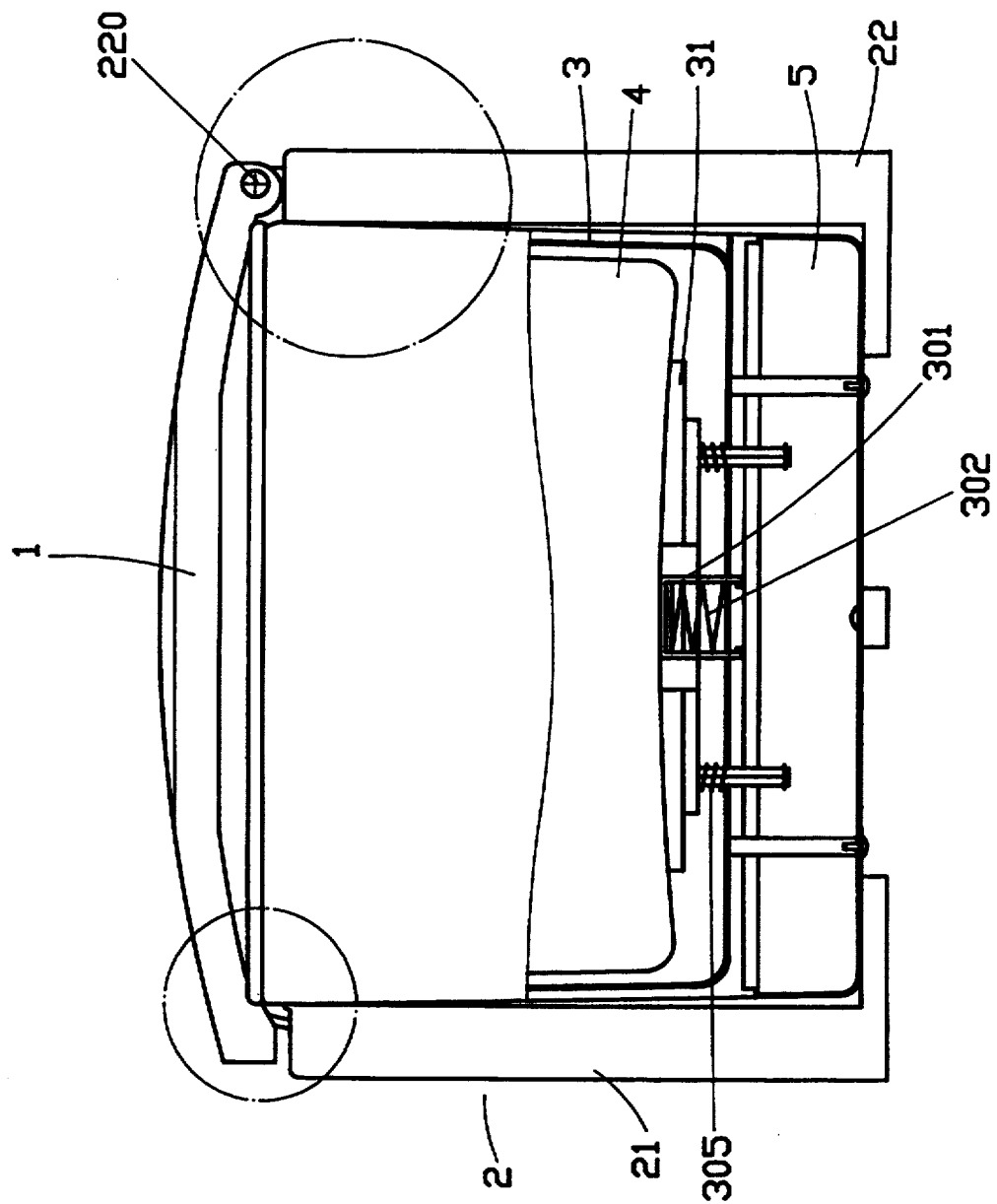

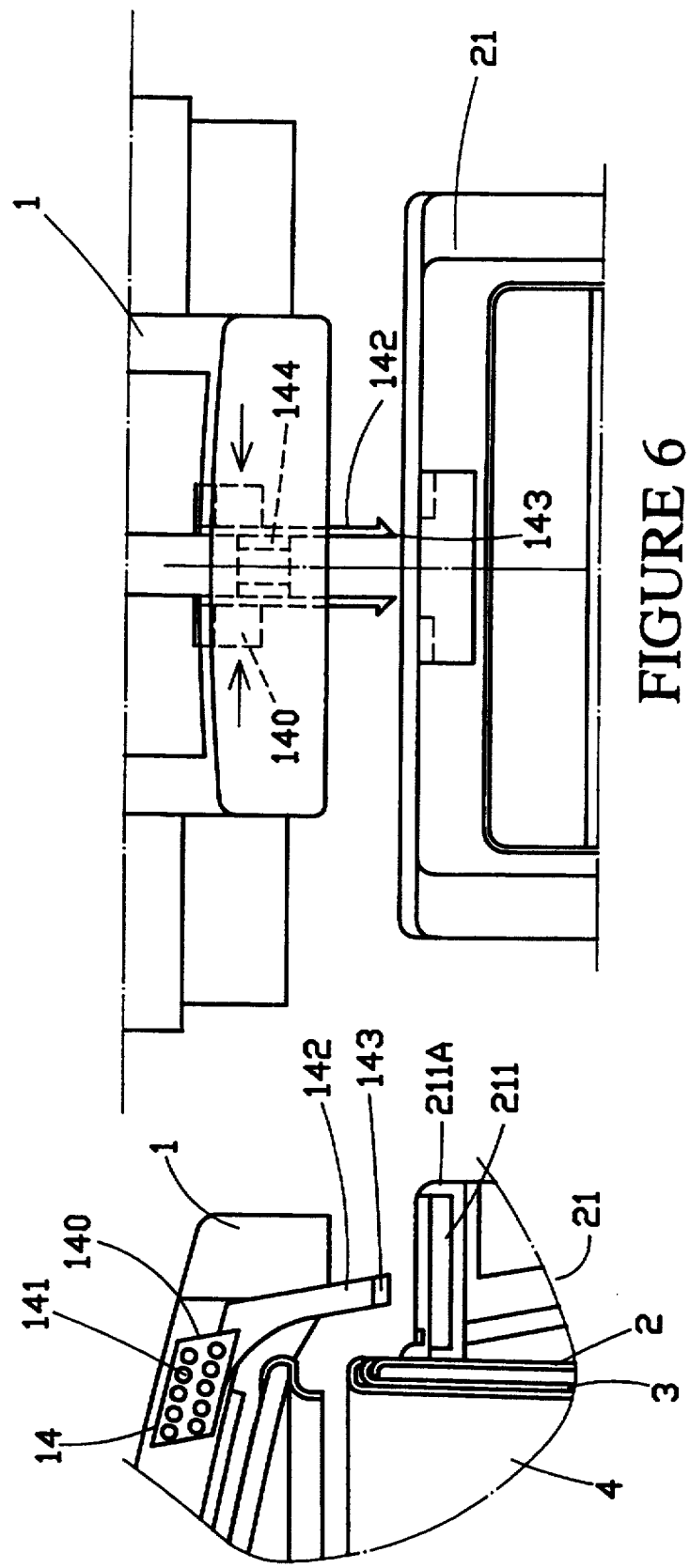

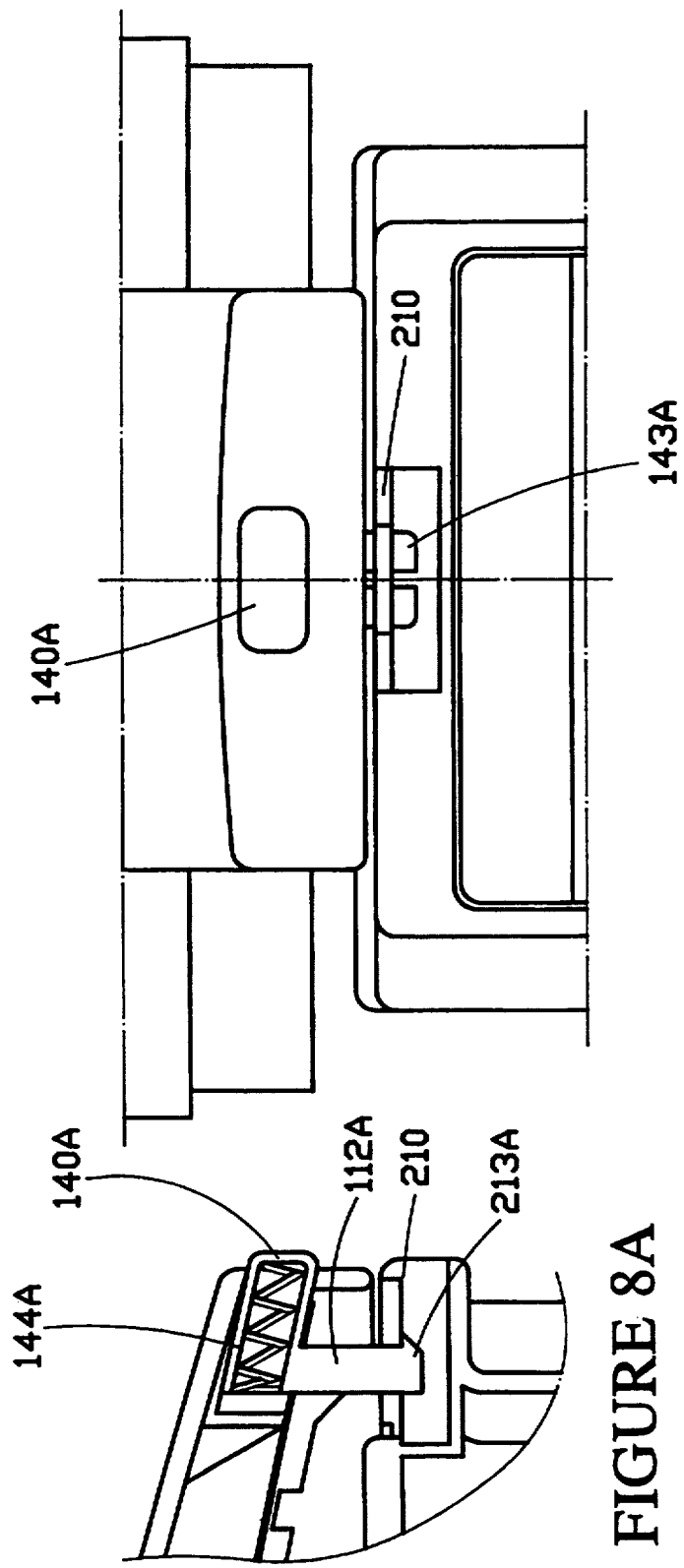

MULTIPURPOSE COOKER

BACKGROUND OF THE INVENTION

The present invention relates to electric cookers, and relates more particularly to a multipurpose cooker which is automatically turned on when the cover is closed or turned off when the cover is opened.

Regular cookers commonly comprise an electric heater fixedly mounted inside an inner casing and an inner pan received in the inner casing and supported on the electric heater for cooking foods. The casing of the electric heater of a cooker may wear away with use, causing the bottom of the inner pan unable to be closely attached to the electric heater for a uniform heating. When the power switch of a cooker is turned on, the electric heater keeps heating the inner pan. If the cover is closed tight while heating, steam will escape out of the inner pan. Furthermore, water drops tend to gather around the parts of the cover during cooking of a cooker. If water drops are not collected and removed from the cover, they may pass through gaps in the cooker causing the electronic parts of the cooker damaged.

SUMMARY OF THE INVENTION

The present invention provides a multipurpose cooker which eliminates the aforesaid problems. According to one aspect of the present invention, the multipurpose cooker comprises a cooker body a cover hinged to the cooker body, an inner casing fixedly mounted within the cooker body, an electric heater supported on springs inside the inner casing, a heating control circuit, an inductor disposed inside the inner casing, an inner pan received within the inner casing and supported on the electric heater, wherein the inner pan is forced by the cover to contact the inductor when the cover is closed, causing the heating control circuit to turn on the electric heater; the electric heater is lifted by the springs to move the inner pan away from the inductor when the cover is opened, causing the heating control circuit to turn off the electric heater. According to another aspect of the present invention, the cover has a downward annular flange, which fits into the inner pan to seal its top opening when the cover is closed. According to still another aspect of the present invention, the cooker body comprises two water trays mounted on two opposite sides thereof for collecting water gathered around the cover.

BRIEF DESCRIPTION OF THE DRAWINGS

FIG. 5 is a side view in plain of the multipurpose cooker shown in FIG. 3 when closed;

FIGS. 6 and 6A shows the hooking device of FIG. 2 unhooked;

FIGS. 8 and 8A shows an alternate form of the hooking device according to the present invention.

DETAILED DESCRIPTION OF THE PREFERRED EMBODIMENT

Figure 1:
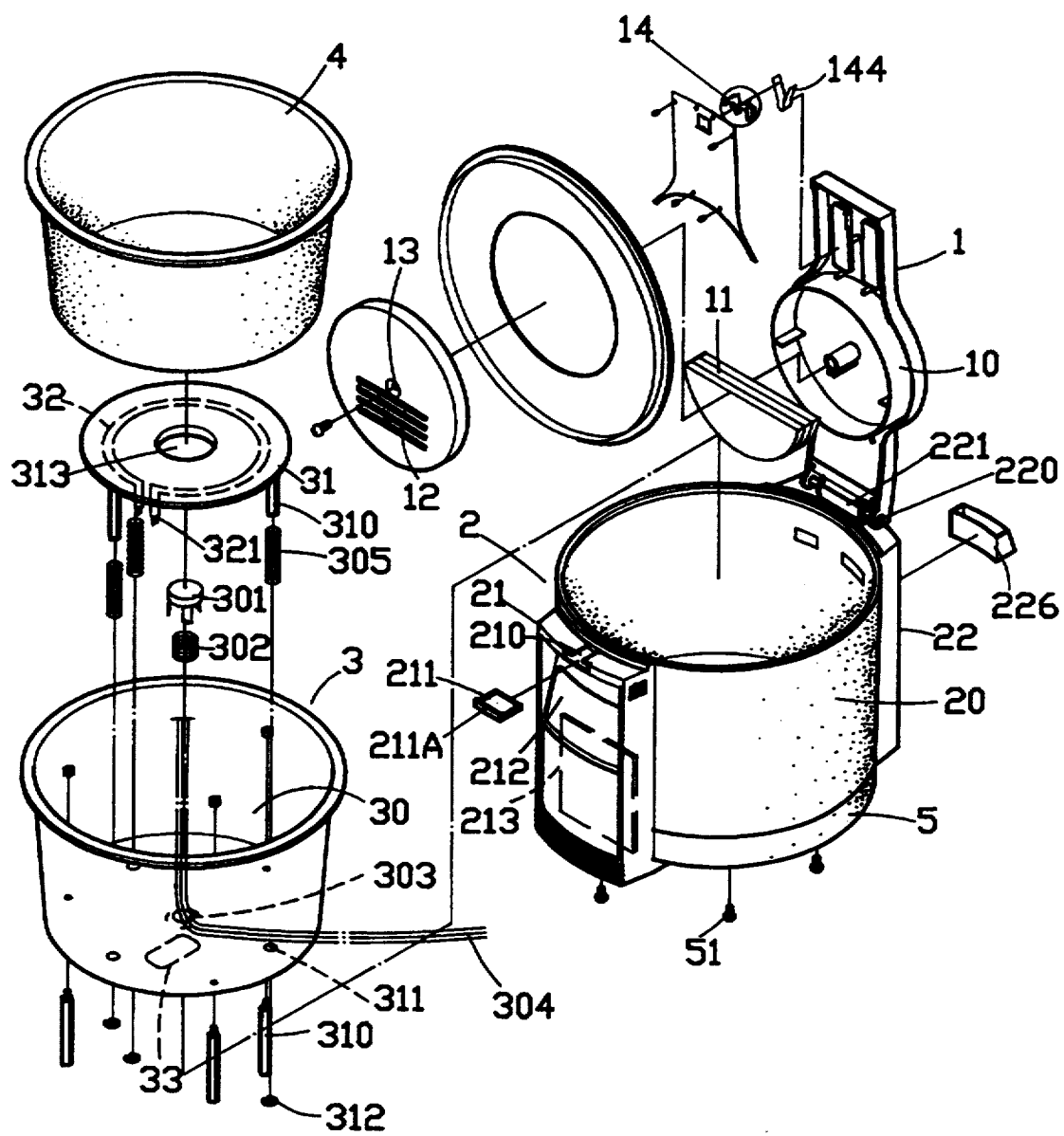
FIG. 1 is an exploded view of a multipurpose cooker according to the present invention.
Figure 1A:
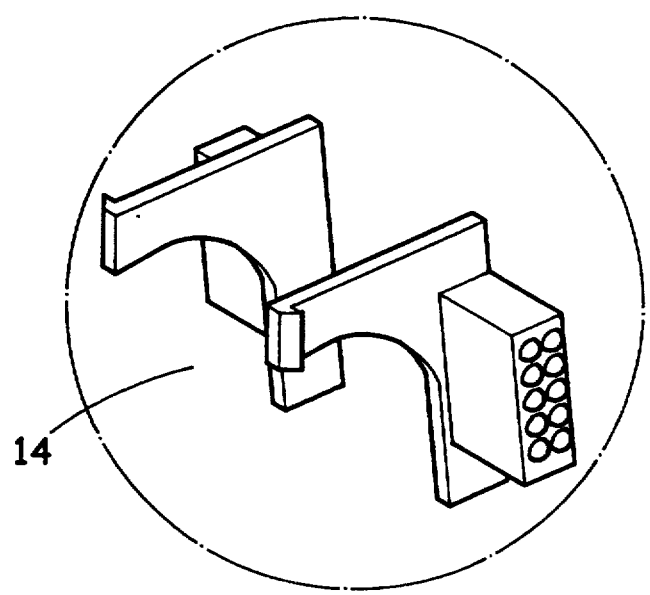
FIG. 1A is an enlarged view of the circled area of FIG. 1.
Figure 2:
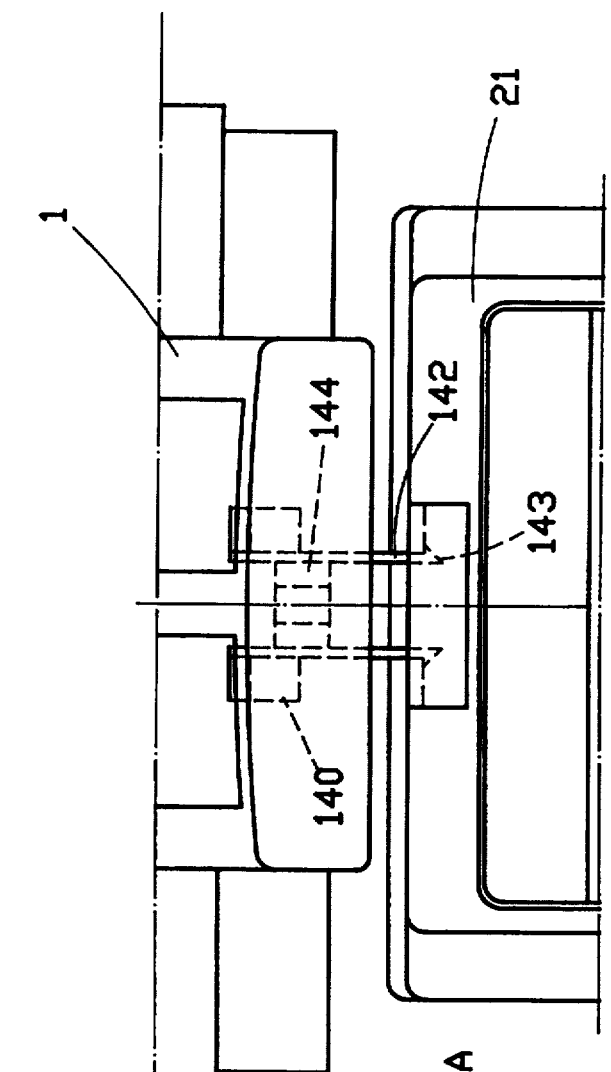
FIGS. 2 and 2A shows the structure of the hooking device on the cover assembly of the multipurpose cooker shown in FIG. 1.
Figure 2A:
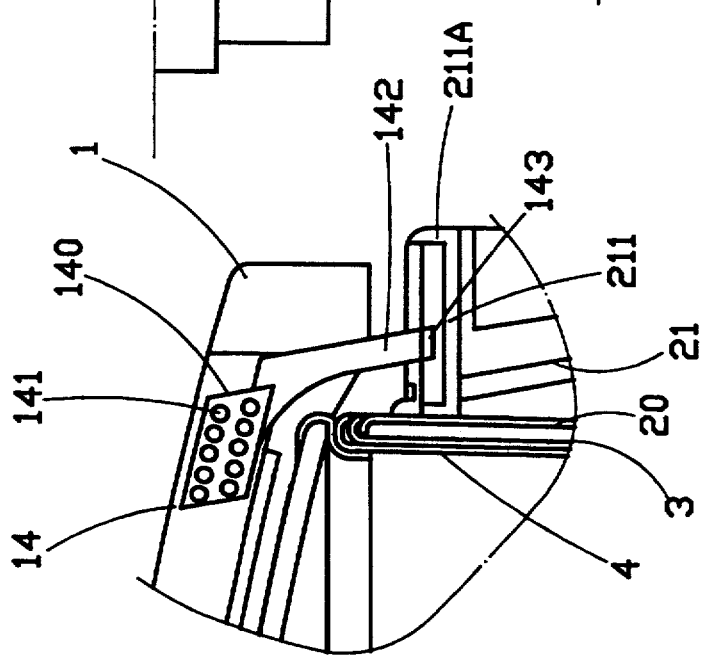
Figure 3:
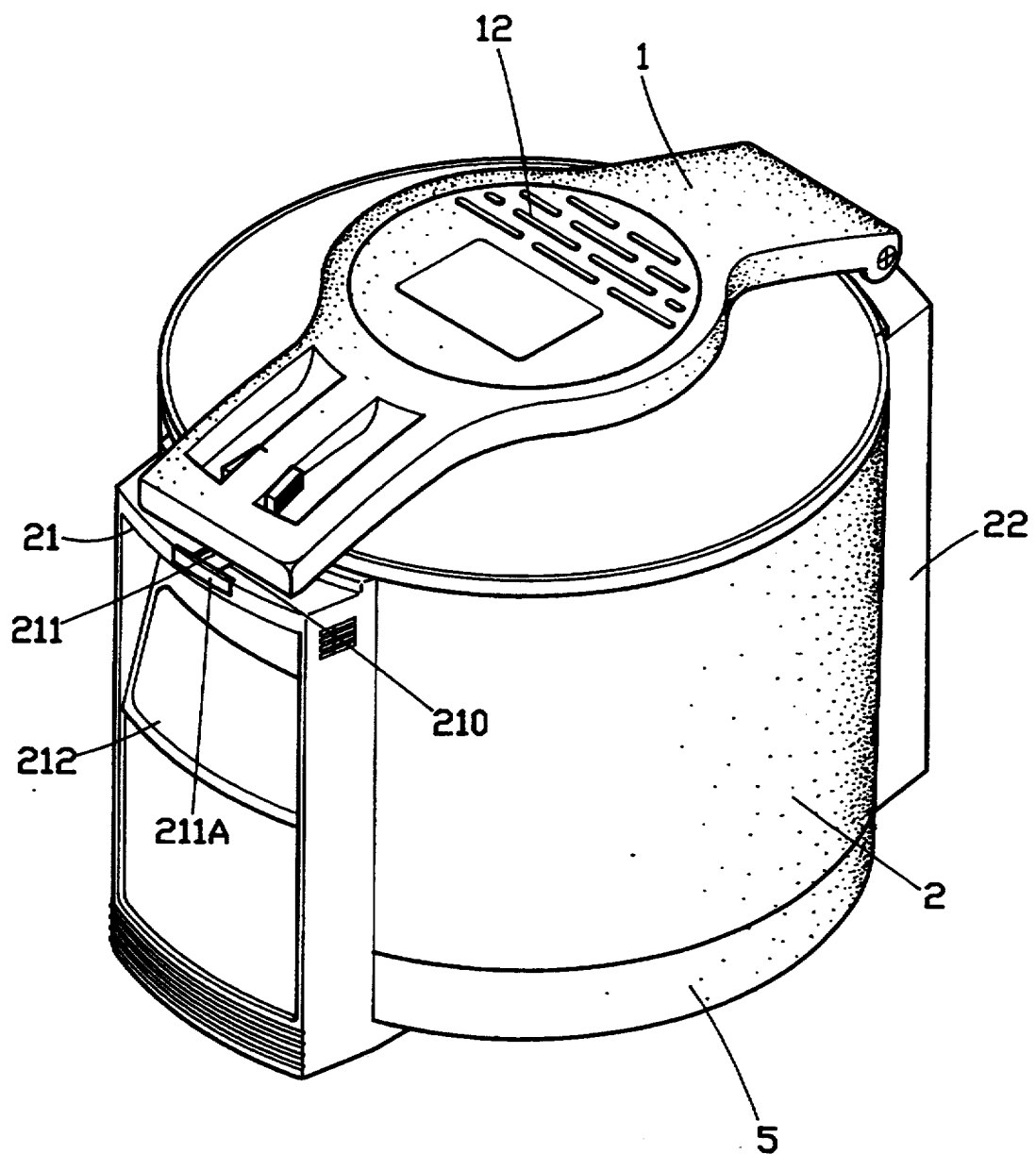
FIG. 3 is a front oblique view of the multipurpose cooker shown in FIG. 1.
Figure 4:
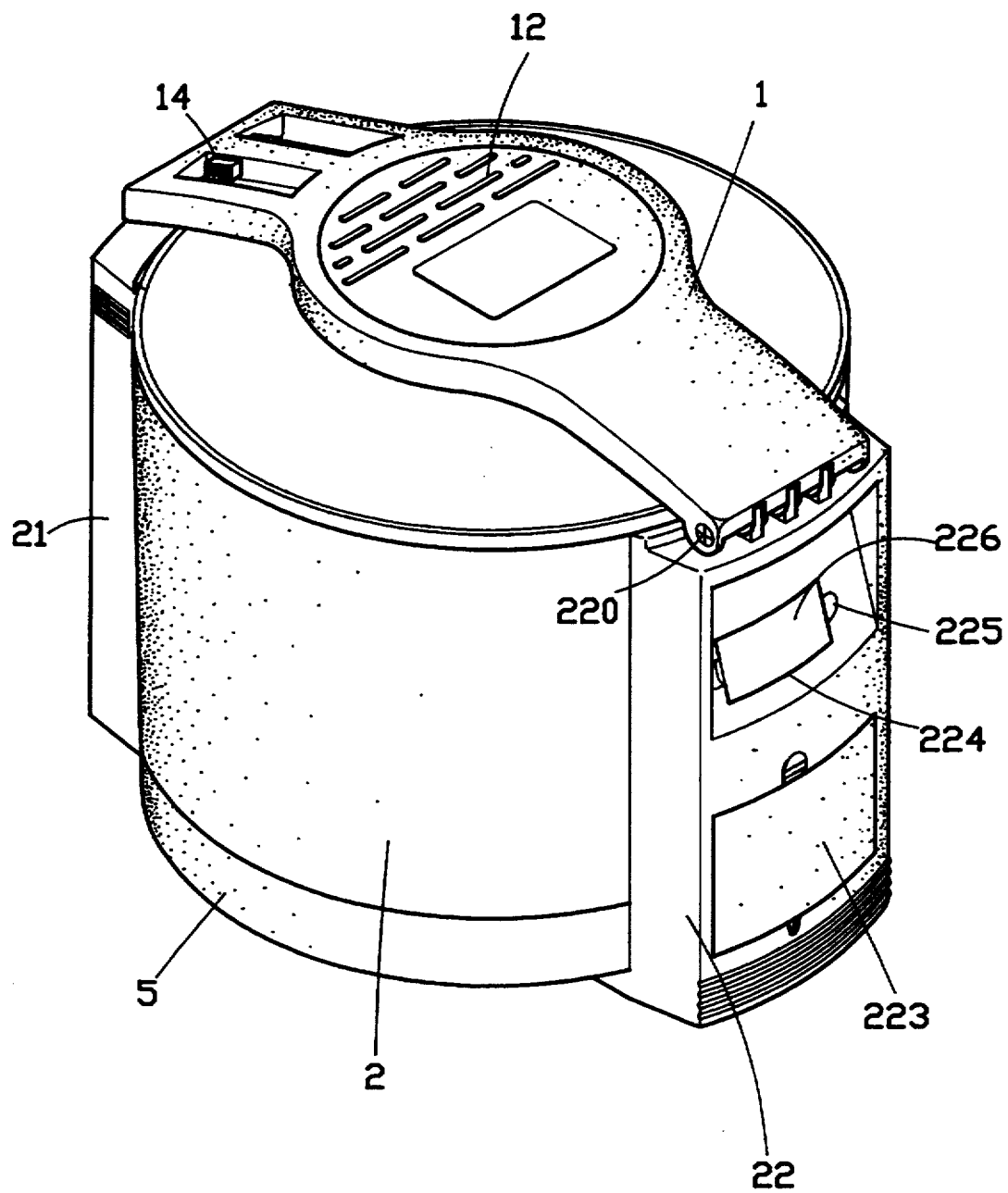
FIG. 4 is a rear oblique view of the multipurpose cooker shown in FIG. 1.
Figure 5B:
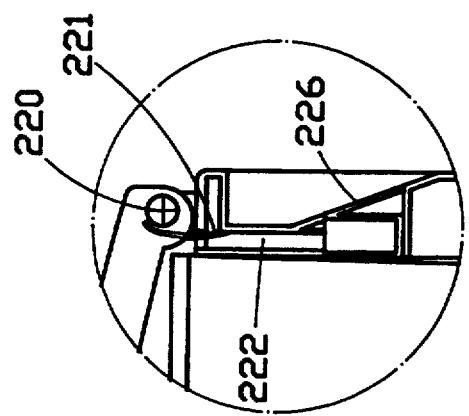
FIG. 5B is an enlarged view of the right circled area in FIG. 5.
Figure 5A:
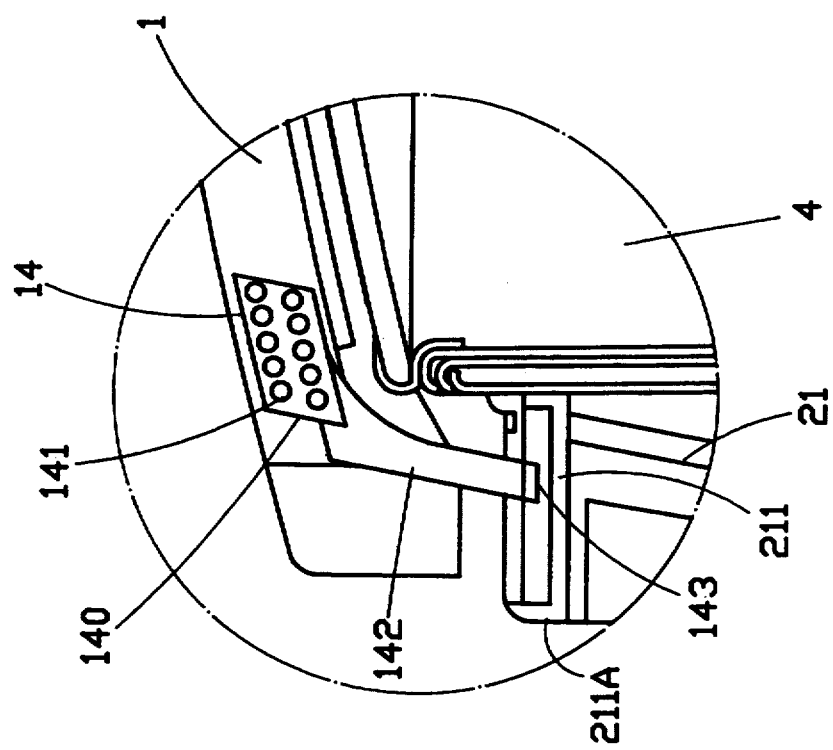
FIG. 5A is an enlarged view of the left circled area in FIG. 5

Referring to FIG. 1, a multipurpose cooker in accordance with the present invention is generally comprised of a cover assembly 1, a cooker body 2, an inner casing 3, an inner pan 4, and a base 5.

Referring to FIGS. 2, 2A, 1 and 1A again, the cover assembly 1 comprises a rim holder 10, a rim 16, a locating plate 13 fastened to the rim holder 10 to hold the rim 16 between, and an absorptive pad 11 received inside the rim holder 10. The rim 16 has a downward annular flange 15 disposed around the border for fitting into the top opening of the inner pan 4. Air vents 12 are made on the rim holder 10 and the locating plate 12 for letting steam pass to the outside. The rim holder 10 has one end hinged to the cooker body 2 and an opposite end mounted with a hooking device 14. When the cover assembly 1 is closed, the hooking device 14 automatically locks the rim holder 10 in the closed position. The hooking device 14 comprises two opposite press keys 140 and a spring 144 stopped between the press keys 140. The press keys 140 have a respective embossed outer wall 141 and a respective retainer rod 142 with a hooked bottom end 143.

Referring to FIGS. 3, 4, 5, 5A, and 5B, and FIG. 1 again, the cooker body 2 comprises a housing 20, a front mount 21 and a rear mount 22 vertically made on housing 20 on the outside at two opposite locations. The front mount 21 comprises a top retaining groove 210, a water tray 211 with a front finger flange 211A inserted into the top retaining groove 210, a display panel 212 disposed below the water tray 211 for function display, and a heating control circuit 213 disposed on the inside below the display panel 212. The rear mount 22 comprises a pivot 220 transversely disposed at the top, to which the cover assembly 1 is pivoted, a wire chamber 223, which receives an electric cord (not shown), a water guide hole 222 vertically disposed at the top, an water-proof flap 221 covered on the pivot 220 and extended into the water guide hole 22, a front chamber 224 spaced above the wire chamber 223 and communicated with the water guide hole 222, a water tray 226 inserted into the front chamber 224 to collect water from the water guide hole 222, and two half-round holes 225 communicated with the front chamber 224 for inserting fingers to remove the water tray 226 from the front chamber 224.

Referring to FIG. 1 again, the inner casing 3 is a hollow, rounded container mounted within the housing 20 of the cooker body 2 and fixed to the base 5, comprising a flat bottom wall 30, an inductor 301 supported on a spring 302 above a center hole 303 on the bottom wall 30, an electric wire 304 having one end connected to the inductor 301 and an opposite end inserted through the center hole 303 and connected to the heating control circuit 213, an electric heater 31 supported on springs 305 above the bottom wall and having guide rods 310 extended out of holes 311 on the bottom wall 30 and fastened with foot pads 312. The electric heater 31 comprises a center hole 313, which receives the inductor 301, and a an electric heating coil 32. Thee two opposite ends 321 of the electric heating coil 32 extend out an opening 33 on the bottom wall 30 and connected to the heating control circuit 213.

Referring to FIG. 1 again, the inner pan 4 is received within the inner casing 3 above the electric heater 31 to hold foods for cooking. The base 5 is fixedly fastened to the cooker body 2 at the bottom by fastening elements 51.

Figure 7:
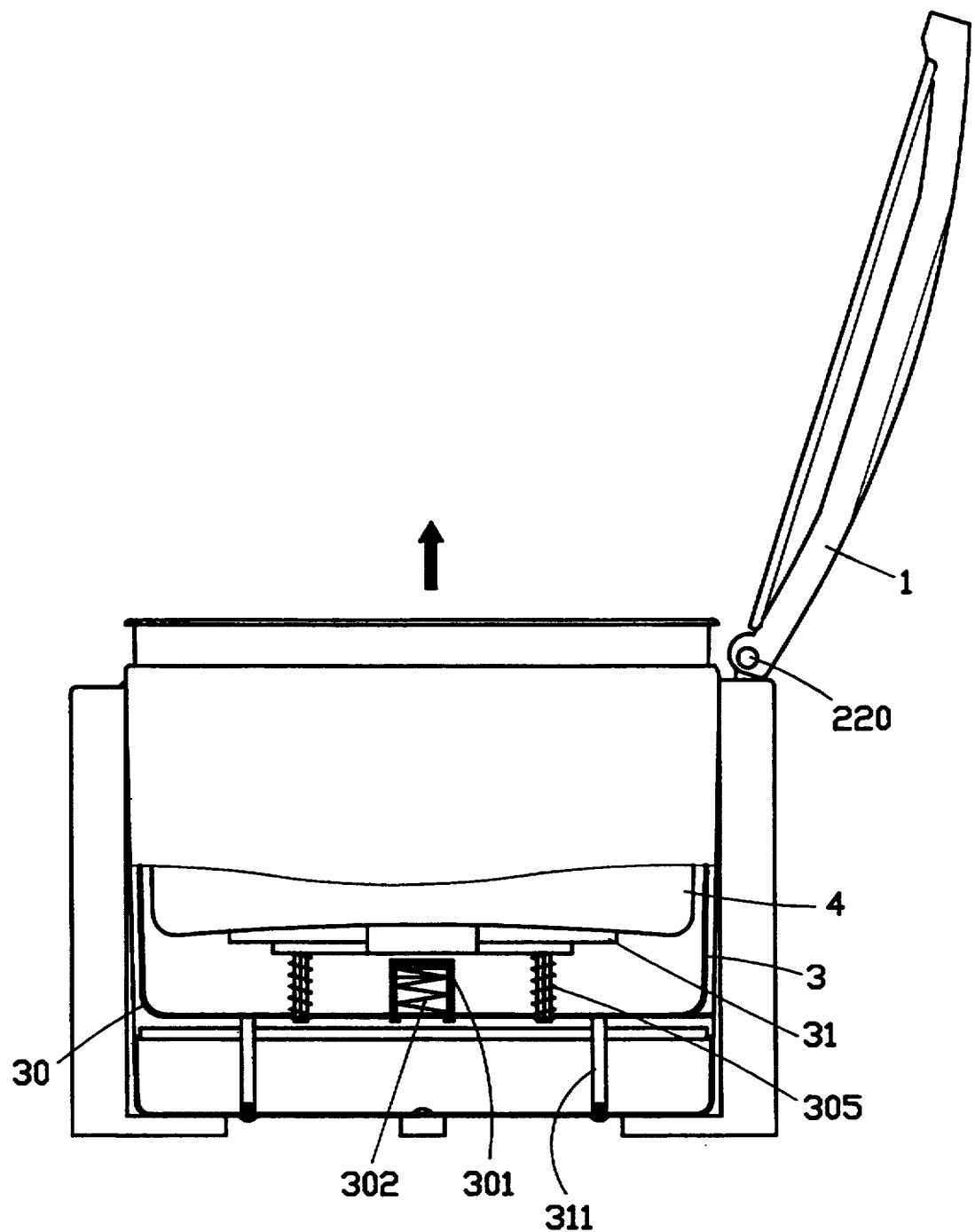
FIG. 7 is a side view in plain of the multipurpose cooker shown in FIG. 3 when opened.

Referring to FIG. 7, when the cover assembly 1 is opened, the inner pan 4 is supported on the electric heater 31 and spaced from the inductor 301, causing a broken circuit, and therefore the heating control circuit 213 does no work (the electric heating coil 32 of the electric heater 31 is turned off).

Referring to FIGS. 2, 2A, 5, 5A, and 5B again, when the cover assembly 1 is closed, the downward annular flange 15 of the rim 16 fitted into the inner pan 4, the hooked bottom ends 143 of the retainer rods 142 of the hooking device are forced to hooking device on the top retaining groove 210 to hold the cover assembly 1 in the closed position, and the inner pan 4 is forced downwards to contact the inductor 301 causing the inductor 301 electrically connected, and therefore the heating control circuit 213 turns on the electric heating coil 32 of the electric heater 31 to heat the inner pan 4.

Referring to FIGS. 6, 6A and 7, when the press keys 140 of the hooking device 14 are squeezed inwards toward each other, the hooked bottom ends 143 of the retainer rods 142 are moved away from the retaining groove 210, and therefore the cover assembly 1 is unlocked and can be opened from the inner pan 4. When the cover assembly 1 is opened, the springs 305 forces the electric heater 31 upwards to its former position, causing the inner pan 4 disconnected from the inductor 301, and therefore the electric heater 31 is turned off again.

FIGS. 8 and 8A shows an alternate form of the hooking device 14 for the cover assembly 1. This alternate form comprises a spring element 144A, a press button 140A supported on the spring element 144A, a retainer rod 142A perpendicularly downwards extended from the press button 140A and terminating in a bottom hooking device 143A. When the press button 140A is depressed, the retainer rod 142A is moved backwards, causing the bottom hooking device 143A released from the retaining groove 210; when the press button 140A is released, the spring element 144A forces the push button 140A back to its former position, and therefore the bottom hooking device 143A is moved forwards to hooking device on the retaining groove 210 again.

While only one embodiment of the present invention has been shown and described, it will be understood that various modifications and changes could be made without departing from the spirit and scope of the invention.

What is claimed is:

1. A multipurpose cooker comprising a cooker body having a front mount and a rear mount on the outside, a cover having one end hinged to said rear mount by hinge means and an opposite end mounted with a hooking device for hooking on a retaining groove on said front mount, an inner casing fixedly mounted within said cooker body, an electric heater supported on spring means within said inner casing, a heating control circuit mounted inside said front mount, an inductor disposed inside said inner casing, an inner pan received within said inner casing and supported on said electric heater, and wherein said inner pan is forced by said cover to contact said inductor when said cover is closed, causing said heating control circuit to turn on said electric heater; said electric heater is lifted by said spring means to move said inner pan away from said inductor when said cover is opened, causing said heating control circuit to turn off said electric heater.

2. The multipurpose cooker of claim 1 wherein said inductor is supported on a spring element inside said inner casing and disposed within a center through hole on said electric heater.

3. The multipurpose cooker of claim 1 wherein said front mount comprises a sliding water tray detachably mounted within said retaining groove for collecting water from said cover; said rear mount comprises a chamber, a water-proof flap covered on said hinge means and extended into said chamber, a water tray detachably mounted within said chamber for collecting water guided from said cover by said water-proof flap.

4. The multipurpose cooker of claim 1 wherein said cover comprises an annular downward flange, which fits into said inner pan to close it when said cover is closed.

5. The multipurpose cooker of claim 1 wherein said inner casing has a plurality of through holes on a bottom wall thereof; said electric heater is supported on said bottom wall of said inner casing by said spring means, having a plurality of bottom guide rods inserted into said through holes and respectively coupled with a respective foot pad, the foot pads of said bottom guide rods being stopped at said bottom wall of said inner casing when said cover is opened, the foot pads of said bottom guide rods being carried by said bottom guide rods downwards away from said bottom wall of said inner casing when said cover is closed.

6. The multipurpose cooker of claim 1 wherein said hooking device comprises a button supported on a spring element fastened to said cover and a hook downwards perpendicularly extended from said button.

* * * * *